United States Patent [19]
Stratton

[11] 3,866,261
[45] Feb. 18, 1975

[54] END CLIP FOR UNIVERSAL BLADE
[75] Inventor: Donald W. Stratton, Hammond, Ind.
[73] Assignee: The Anderson Company, Gary, Ind.
[22] Filed: Feb. 1, 1973
[21] Appl. No.: 328,648

[52] U.S. Cl. .......................................... 15/250.42
[51] Int. Cl. ............................................. B60s 1/02
[58] Field of Search....... 15/250.42, 250.36, 250.37, 15/250.38, 250.39

[56]         References Cited
        UNITED STATES PATENTS
3,029,460   4/1962   Hoyler ............................ 15/250.42
3,083,394   4/1963   Scinta .......................... 15/250.42 X
3,116,507   1/1964   Scinta ............................ 15/250.42

Primary Examiner—Peter Feldman
Attorney, Agent, or Firm—Wegner, Stellman, McCord, Wiles & Wood

[57] ABSTRACT

A windshield wiper assembly for a curved windshield, including a pressure distributing superstructure having opposed claws adapted to engage a blade holder at longitudinally spaced positions, a flexible holder having laterally opening slots for receiving the superstructure claws and a longitudinal retention chamber with an opening along the bottom for receiving a wiping member having a retention bead disposed in the retention chamber, together with an end clip for retaining the holder against longitudinal movement relative to the superstructure in the form of a U-shaped body of resiliently flexible plastic material fitted over the superstructure adjacent opposed claws and having legs embracing the sides of the holder and straddling the claws.

12 Claims, 4 Drawing Figures

PATENTED FEB 18 1975
3,866,261
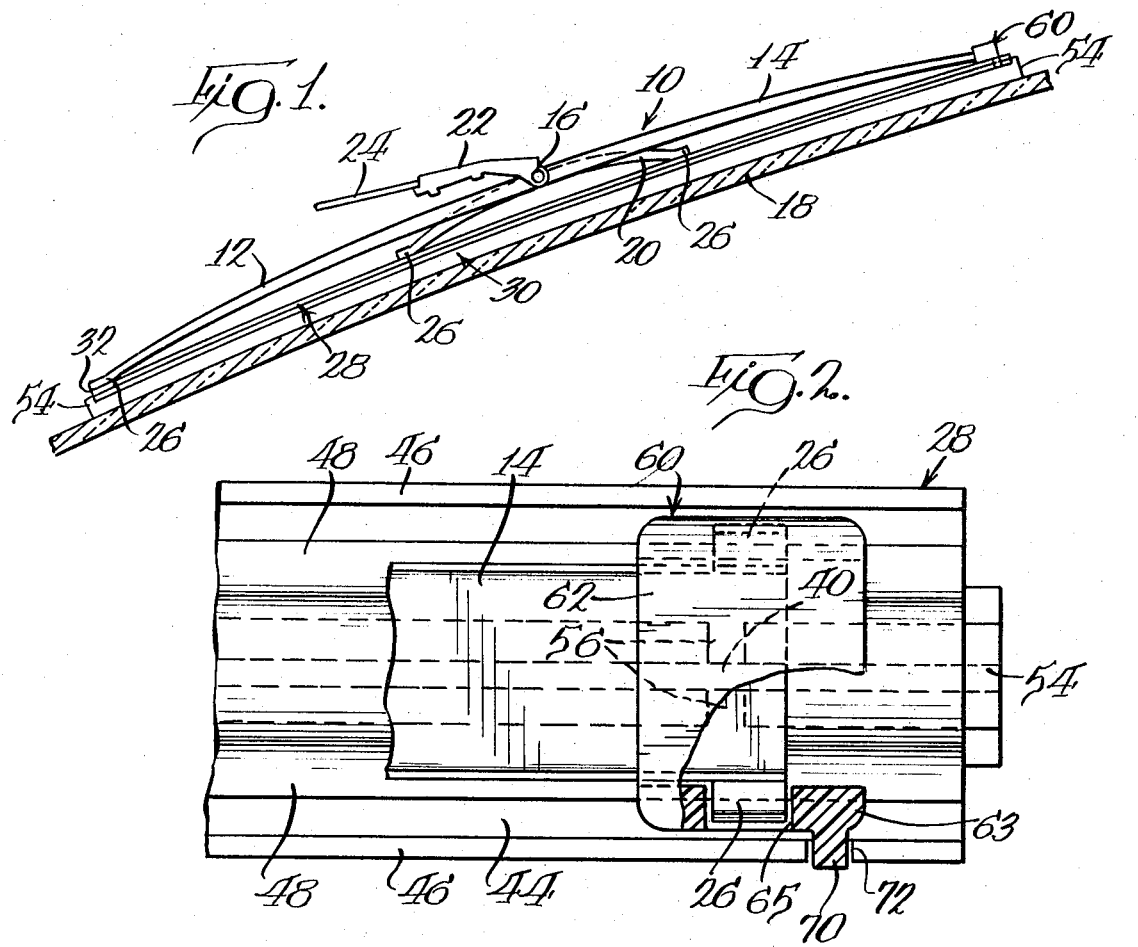
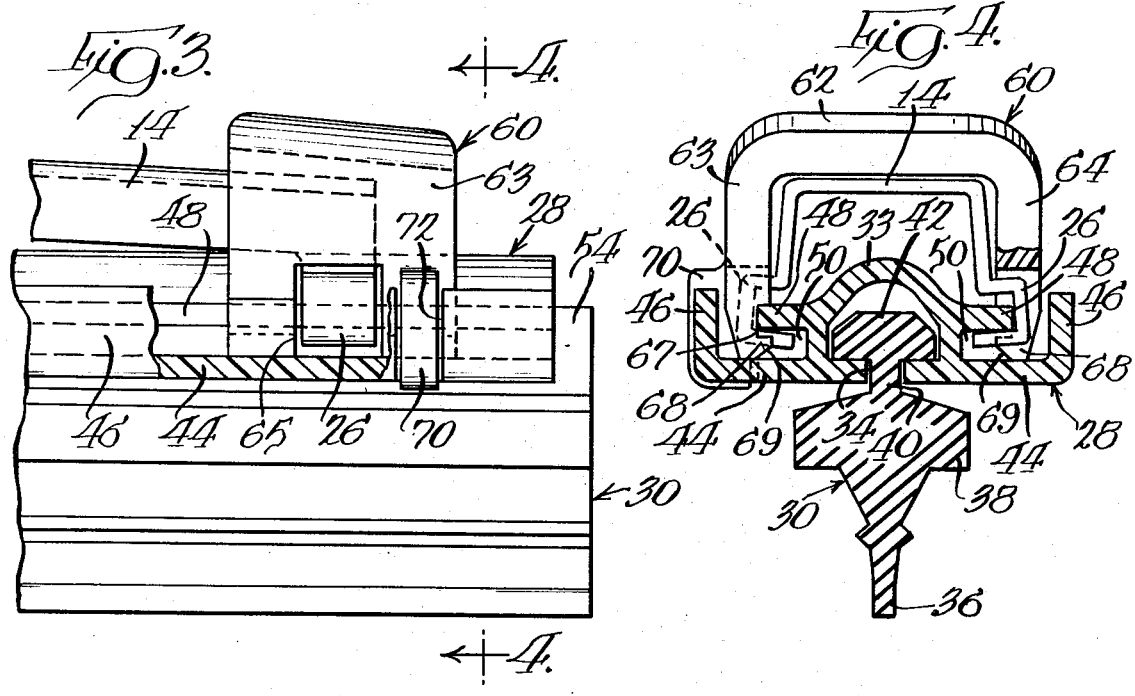

END CLIP FOR UNIVERSAL BLADE

BACKGROUND OF THE INVENTION

The present invention relates in general to a windshield wiper assembly for a windshield, and in particular to a retaining clip for retaining a windshield wiper blade structure assembled with a pressure applying superstructure.

In prior windshield wiper assemblies, the resilient wiping element has often been supported by a planar metal backing member, and sometimes by a backing member made of flexible plastic material. In either event, the backing member is usually supported in a superstructure which includes a plurality of longitudinally spaced claws adapted to releasably engage the backing member to hold the latter in the superstructure for movement with a wiper arm. The claws slidably embrace the backing member at lateral edges, and while movement of the backing member longitudinally relative to the claws is required for conforming the blade to the windshield, at least one pair of the claws usually interfit with the backing member in a manner to prevent separation of the backing member from the superstructure.

In the past, in order to prevent separation of the backing member from the superstructure, it has been conventional to provide notches or abutments along the lateral edges of the backing member adapted to releasably engage the claws. While such interlocking connections have operated reliably, the claws which usually straddle the backing member, and in order to fit properly, the lateral spacing of the claws must be appropriate to fit the lateral width of the backing member, and the longitudinal spacing of the claws must be appropriate to fit the longitudinal spacing of the interlocking notches or abutments on the backing member. Thus, when the blade structure and the superstructure are not initially designed for use with each other, it is sometimes difficult to interfit a replacement blade structure with an existing superstructure.

In the copending application of John P. Moorhead and Donald W. Stratton, Ser. No. 328,649, filed Feb. 1, 1973, entitled Windshield Wiper Blade Structure, the invention is directed toward provision of a universal blade structure including a backing member having a construction adapted to fit various superstructures of different configurations. The backing member has a pair of laterally opening slots for receiving the claws of a superstructure, and a longitudinal retention chamber having an opening along the bottom for receiving an enlarged retention bead along the upper edge of a resilient wiping member. In the copending application, the superstructure includes abutments at opposite ends engageable with opposite ends of the backing member for limiting longitudinal movement of the blade structure relative to the superstructure. However, in some windshield wiper assemblies, the superstructure does not include abutments at both ends for limiting movement of the blade structure. It would be desirable to provide a retention clip for adapting the aforementioned blade structure for use with superstructures which lack adequate means for preventing separation of the blade structure from the superstructure.

Broadly, retention clips have been utilized previously in windshield wiper assemblies, as shown for example in prior U.S. Pat. Nos. 2,782,443, 2,782,447, 2,782,449, 2,983,945 and 3,083,394. However, the prior art clips are not suitable for use with the universal blade structure described above when such blade structure is utilized in a superstructure without retention means at one end.

SUMMARY OF THE PRESENT INVENTION

It is a general object of the present invention to provide a new and improved retention clip for holding a universal blade structure against separating from a supporting superstructure.

More specifically, the clip comprises a U-shaped body of resiliently flexible material including a crosspiece and parallel depending legs adapted to fit over at least one pair of opposed superstructure claws, and the legs have inwardly directed flanges to fit a laterally opening slot in the backing member while embracing the superstructure claws and interlocking with the backing member to prevent separation of the backing member from the superstructure.

Preferably, each leg of the clip includes a notch at the free end for receiving a superstructure claw, and one leg has a projecting finger at the free end adapted to interlock with a blade structure.

As illustrated herein, the clip is formed of molded plastic material.

In a preferred construction, the flexible backing member includes a pair of opposed laterally extending upper flanges and a pair of opposed laterally extending lower flanges defining laterally opening slots, and one lower flange has a notch for receiving the locking finger on the retaining clip.

A specific object of the invention is to provide a windshield wiper assembly for a curved windshield, including a pressure distributing superstructure having at least two pairs of opposed claws engageable with a flexible blade holder at longitudinally spaced positions, the flexible blade holder having continuous laterally opening slots for receiving the pairs of claws of the superstructure and a longitudinal retention chamber having an opening along the bottom, a resilient wiping member having a wiping edge and a retention bead disposed in the chamber of the holder, and an end clip for retaining the holder on the superstructure, said clip being in the form of a U-shaped body of resiliently flexible material fitted over the superstructure and including parallel legs embracing opposed claws in an arrangement in which the legs have inwardly directed flanges fitted in the holder slots, and a locking finger fitted in a notch in the holder.

BRIEF DESCRIPTION OF THE DRAWINGS

FIG. 1 is a perspective view of a windshield wiper assembly embodying the principles of the present invention;

FIG. 2 is an enlarged fragmentary top plan view of the right end of the wiper assembly illustrated in FIG. 1, with a portion of the retention clip broken away;

FIG. 3 is a fragmentary front elevational view of the structure shown in FIG. 2, with a portion of the flexible backing member broken away; and FIG. 4 is a transverse cross-sectional view, taken at about the line 4—4 of FIG. 3.

DETAILED DESCRIPTION OF THE PREFERRED EMBODIMENT

Referring now to the drawings in more detail, a commercially available superstructure 10 includes a pair of levers 12 and 14 of inverted channel-shaped cross section having adjacent ends pivotally connected together at pin 16 and biased by a torsion spring (not visible) which forces the outer ends of the levers 12, 14 toward a windshield 18. Additionally, a central pressure distributing yoke member 20 of inverted channel-shaped cross section has a central portion pivotally mounted by pin 16. The pivot pin 16 joins the superstructure 10 with a connector 22 which connector is adapted to be attached to a spring-pressed wiper arm 24. Opposite ends of the central yoke 24, and the free ends of the levers 12 and 14, are formed with pairs of claws as at 26 engaging a backing member 28 carrying a wiping element 30. At the free end of the lever 12, there is a downwardly turned end portion as at 32 for limiting longitudinal movement of the backing member 28 relative to the superstructure in a direction toward the left as viewed in FIG. 1. The need for the abutment portion 32 is optional.

A wiper assembly of the type illustrated is adapted for cleaning windshields curved or flat on automotive vehicles. The superstructure, including the levers 12 and 14 and the central yoke 20, transmits pressure from the spring-pressed wiper arm 24 to the flexible backing member 28 and the wiping element 30. As a result of the pressure distributed through the superstructure, the backing member tends to conform to the general shape of the windshield. As the wiper assembly is moved back and forth over the windshield, the wiping member conforms to the constantly changing surface of the windshield.

The backing member 28 is preferably formed of extruded flexible plastic material such as nylon, and includes a central tubular portion 33 having a longitudinally extending chamber which functions as a receiver for a retaining bead on the wiping element 30. As illustrated, the retention chamber has a somewhat triangular cross-sectional configuration, and a relatively narrow slot 34 opens into the chamber along the bottom of the tubular portion 33.

The wiping element 30 is preferably made of relatively soft, resilient, rubber-like material, and includes a relatively thin wiping edge 36, a thicker intermediate portion 38, a relatively thin neck portion 40, and an enlarged retention bead 42 along the upper edge.

In the use of the wiper assembly, the wiping element 30 is attached to the backing member 28 with the retention bead 42 of the wiping element disposed in the receiver 33, and with the relatively thin neck portion 40 of the wiping element disposed in the receiver slot 34. As illustrated, the retention bead 42 has a generally triangular cross section which is complementary to the chamber in the tubular portion or receiver 33. The wiping element 30 is attached to the backing element 28 by threading the bead 42 into the receiver 33.

The backing member 28 is relatively wide and relatively thin so as to be flexible in a direction toward and away from the windshield 18. The backing member includes a pair of opposed rails or flanges 44 extending laterally outwardly in opposite directions from the slot 34 at the bottom of the receiver 33. Preferably, each of the flanges 44 is formed along the outside edge with an upwardly directed flange 46 which functions to reinforce and strengthen the flange 44 along the outer edge so as to limit its flexibility in one direction. Above the flanges 44, the receiver 33 is formed with outwardly directed flanges 48 which are spaced above the flanges 44 and spaced inwardly from the flanges 46 in a manner to form slots 50 for receiving the claws 26 of the superstructure.

The wiping element 30 is assembled relative to the backing member 28 by sliding the retention bead 42 into the end of the receiver 33, while the relatively thin neck portion 40 of the wiping element is inserted into the slot 34 in the bottom of the receiver. Preferably, suitable means is utilized for releasably retaining the wiping element against substantial longitudinal movement relative to the backing member, so that the parts do not become disassembled unintentionally. As illustrated herein, the retention bead 42 is formed at opposite ends with an enlarged abutment or stop portion 54 adapted to engage the end of the receiver 28. By virtue of the abutment 54 at each end of the wiping element, the wiping element is retained against significant unintentional longitudinal displacement relative to the backing member.

In order to facilitate insertion of the wiping element into the backing member despite the abutments 54 at opposite ends, the retention bead 42 is omitted for a short length adjacent one end to form a gap as illustrated at 56. In assembly, the end portion of the wiping element adjacent the stop 54 illustrated in FIG. 2 is bent downwardly to expose the end of the retention bead 42 and the left edge of the gap 56, so that the bead may be inserted in the left end of the receiver 33 and moved toward the right to the position illustrated in FIG. 2. At this time, the right end portion of the wiper member 30 may be resiliently stretched to insert the remaining end portion of the bead 42, at the right of the gap 56, into the right end of the receiver 33. Now, when the stretched wiping element is released, it retracts to the position shown in FIG. 2. The wiping element may be removed from the backing member by reversing the procedure.

The backing member 28 with attached wiping element 30 is attachable to the superstructure including levers 12 and 14 and central yoke 20 by insertion of the pairs of claws 26 into the claw slots 50 at the right end of the backing member. The claws fit loosely enough in the slots 50 so that the backing member is slidable relative to the claws to longitudinally position the backing member properly relative to the superstructure. When the backing member and the wiping member are positioned as illustrated in FIG. 1, the downwardly directed end portion 32 on the lever 12 limits longitudinal movement of the backing member toward the left relative to the superstructure.

In order to prevent disconnection of the backing member 28 from the superstructure, a retention clip 60 is mounted on the backing member 28 in embracing relationship to one pair of claws 26 on the end of the yoke or lever 14 adjacent one end of the backing member 28. The retention clip 60 comprises an inverted U-shaped body of resiliently flexible material including a relatively flat crosspiece 62 with depending legs 63 and 64 at opposite sides extending in parallel planes generally perpendicular to the crosspiece 62. At the free ends of the legs 63 and 64, each is formed with a notch or recess 65 so that the lower end of each leg is bifurcated and includes spaced leg portions adapted to loosely embrace a claw 26, with the clip fastened to the backing member 28 and embracing the one pair of claws on the superstructure, the superstructure is operatively positioned on the backing element for use. In order to retain the clip 60 on the backing member 28, each of the legs 63 and 64 is formed adjacent the free end with an inwardly facing groove 67 for receiving the outwardly directed flanges 48 on the receiver 33. The lower overlapping edge or flange 68 of each groove 67 has an inwardly and angularly directed portion 69 which portion 69 acts as a guide to spread the legs 63, 64 as the clip 60 is forced down over the edges of the flanges 48 of the flexor 28. In order to restrain the clip 60 against longitudinal movement relative to the backing member, the leg 63 is formed with a locking finger 70 which projects laterally outwardly and downwardly beyond the leg 63 to fit into a slot 72 formed in adjacent flanges 44 and 46 of the backing member.

In the use of the invention, the retention clip 60 is preferably comprised of molded plastic material which is resiliently flexible. In applying the clip, it is placed over the end of the lever 14, with the legs 63 and 64 straddling the lever, and with one pair of claws 26 on yoke or lever 14 disposed in the notches 65 in the legs 63 and 64. At the same time, the locking finger 70 is aligned with the slot or notch 72 in the backing member and the angled portion 69 on the legs 63, 64 are engaged with the edges of the flanges 48. Pressure is applied to the clip toward the backing member 28 until the legs 63, 64 spread and snap over the flanges 48 to seat the edges of the flanges 48 in the grooves 67 to lock the clip to the backing member. As a result of the interlock of the clip with the backing member, the backing member and the superstructure are held assembled together thereby permitting the wiper blade assembly to flex in conforming to the surface of the windshield as the pairs of claws of the superstructure move relative to the backing member. The resilient flexibility of the clip permits removal by reversing the procedure described above. That is, the finger 70 may be pulled outwardly to release the flange 68 from the flange 48, permitting the clip to be lifted from the lever 14 and the holder 28. With the clip removed the superstructure can be disconnected from the backing member 28 and the backing member and/or wiping element can be replaced in the superstructure, the clip 60 fixed in place and the blade is ready for renewed effective wiping service.

I claim:

1. A clip for holding a windshield wiper blade structure in assembled relationship on a superstructure, comprising:
   a. an inverted U-shaped body of resiliently flexible material open at the opposite ends including
   b. a relatively flat crosspiece with depending legs extending in parallel planes generaly normal to the crosspiece,
   c. inwardly directed attaching means at the free ends of the legs extending toward each other,
   d. free end portion of at least one leg having a retention means for embracing one claw of a superstructure, and
   e. means at the free end of at least one leg for interlocking engagement with a blade structure.

2. A clip as defined in claim 1, wherein the legs include inwardly facing grooves defining said attaching means.

3. A clip as defined in claim 1, wherein a projection extends laterally outwardly from said one leg and longitudinally beyond the end of such leg.

4. A clip as defined in claim 1, wherein the body is comprised of molded plastic material.

5. A windshield wiper assembly, comprising,
   a. an elongate flexible backing member adapted to be attached to a superstructure for supporting a resilient wiping member,
   b. said backing member having a pair of continuous laterally opening slots for receiving opposed claws of the superstructure at longitudinally spaced positions, and a longitudinal retention chamber having an opening along the bottom,
   c. a retaining clip for holding the backing member in assembled relationship with the superstructure comprising a U-shaped body of resiliently flexible material having a crosspiece adapted to bridge the top of one end portion of the superstructure adjacent opposed claws and a pair of longitudinally spaced depending legs at each side adapted to embrace the sides of the backing member,
   d. each pair of longitudinally spaced depending legs embracing one of said claws so as to limit longitudinal movement of the superstructure relative to the clip,
   e. inwardly directed flanges at the ends of the legs positionable in the laterally opening slots for securing the clip to the backing member, and
   f. locking means on one leg interlocking with the backing member to hold the clip against longitudinal movement relative to the backing member.

6. A windshield wiper assembly as defined in claim 5, wherein the flexible backing member comprises extruded plastic material.

7. A windshield wiper assembly as defined in claim 5, wherein the flexible backing member includes a pair of opposed laterally extending upper flanges and a pair of opposed laterally extending lower flanges defining said laterally opening slots, and one lower flange has a notch receiving said locking means on the retaining clip.

8. A windshield wiper assembly as defined in claim 5, wherein the flexible backing member includes a pair of opposed laterally extending upper flanges and a pair of opposed laterally extending lower flanges defining said laterally opening slots, and the lower flanges include upwardly directed flanges at the outer edge, one of which has a notch receiving the locking means on the retaining clip.

9. A windshield wiper assembly as defined in claim 5, wherein retaining clip comprises molded plastic material.

10. A windshield wiper assembly for a curved windshield, comprising,
    a. a pressure distributing superstructure having opposed claws adapted to engage a blade holder at longitudinally spaced positions,
    b. a flexible holder having a pair of laterally opening slots for receiving the claws of the superstructure, a longitudinal retention chamber having an opening along the bottom, and a notch near one end for an end clip,
    c. a resilient wiping member having a wiping edge and a retention bead disposed in the retention chamber, and
    d. an end clip for retaining the holder on the superstructure comprising a U-shaped body of resiliently flexible material having a crosspiece and parallel depending legs fitted over the superstructure adjacent opposed claws, said legs having inwardly directed flanges fitted in the laterally opening slots of the holder, said legs having notches receiving at least one of said opposed claws, and one of said legs having a projection fitted in the notch in the holder, whereby the clip restrains the holder against disassembly from the superstructure.

11. A windshield wiper assembly as defined in claim 10, including cooperating means on the holder and wiping member for limiting longitudinal movement of the wiping member relative to the holder.

12. A windshield wiper assembly as defined in claim 10, wherein the holder is comprised of extruded plastic material, and the clip is comprised of molded plastic material.

* * * * *